(12) United States Patent  (10) Patent No.: US 7,756,072 B1
Fenner et al.  (45) Date of Patent: Jul. 13, 2010

(54) SYSTEM AND METHOD FOR PASSIVELY MONITORING CUSTOMER CONTROL MESSAGES IN A MULTICAST VPN

(75) Inventors: William Fenner, Woodside, CA (US); Fragkiskos Papadopoulos, Los Angeles, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1124 days.

(21) Appl. No.: 11/321,464

(22) Filed: Dec. 30, 2005

(51) Int. Cl.
*H04L 12/28* (2006.01)
*H04L 12/56* (2006.01)

(52) U.S. Cl. .................. 370/326; 370/256; 370/390; 370/392; 370/432

(58) Field of Classification Search .............. 370/230.1, 370/390, 395.24, 256, 392, 432; 705/2; 709/238, 709/248, 206; 726/15
See application file for complete search history.

(56) References Cited

U.S. PATENT DOCUMENTS

| | | | |
|---|---|---|---|
| 6,339,595 B1 | 1/2002 | Rekhter et al. | |
| 6,477,169 B1 * | 11/2002 | Angle et al. | 370/395.42 |
| 6,502,140 B1 * | 12/2002 | Boivie | 709/238 |
| 6,788,681 B1 | 9/2004 | Hurren et al. | |
| 6,910,067 B1 | 6/2005 | Sitaraman et al. | |
| 6,912,232 B1 | 6/2005 | Duffield et al. | |
| 6,965,883 B2 | 11/2005 | Xu et al. | |
| 7,009,971 B2 * | 3/2006 | Novaes | 370/390 |
| 7,215,637 B1 * | 5/2007 | Ferguson et al. | 370/230.1 |
| 7,333,486 B2 * | 2/2008 | Novaes | 370/390 |
| 7,415,534 B2 * | 8/2008 | Jamieson et al. | 709/242 |
| 7,522,599 B1 * | 4/2009 | Aggarwal et al. | 370/390 |
| 7,522,600 B1 * | 4/2009 | Aggarwal et al. | 370/390 |
| 7,558,263 B1 * | 7/2009 | Aggarwal et al. | 370/390 |
| 7,564,806 B1 * | 7/2009 | Aggarwal et al. | 370/256 |
| 7,570,605 B1 * | 8/2009 | Aggarwal et al. | 370/256 |
| 2005/0114174 A1 * | 5/2005 | Raden et al. | 705/2 |
| 2006/0088031 A1 * | 4/2006 | Nalawade | 370/390 |
| 2006/0294259 A1 * | 12/2006 | Matefi et al. | 709/248 |
| 2007/0204339 A1 * | 8/2007 | Bou-Diab | 726/15 |

OTHER PUBLICATIONS

Cisco Systems White Paper, "Multicast Virtual Private Networks", Sep. 2002.
Cisco Systems, "Chapter 7, Multicast VPN", Dec. 2005.
Cisco Systems, "IP Multicast Technology Overview", Apr. 18, 2002.

* cited by examiner

*Primary Examiner*—William Trost, IV
*Assistant Examiner*—Emmanuel Maglo
(74) *Attorney, Agent, or Firm*—Hope Baldauff Hartman LLC

(57) ABSTRACT

A system and method to passively monitor multicast control traffic in the provider backbone. A monitoring station is located within the service provider network. Upon creation of an MVPN session, this monitoring station joins the default multicast distribution tree ("MDT") in the provider backbone used to handle traffic within that MVPN session, and receives the customer's multicast control traffic encapsulated in packets addressed to the default MDT. Using these two kinds of packets, the monitor learns the following information: the identity of the PE routers participating in the MVPN; the identity of the customer multicast groups that are carried on each provider multicast data tree (MDT); the identity of one or more PE routers participating in each customer group, and the identity of the MDT that it is carried on. This information is collected for each customer multicast group, both upstream and downstream at each PE router.

16 Claims, 5 Drawing Sheets

SYSTEM AND METHOD FOR PASSIVELY MONITORING CUSTOMER CONTROL MESSAGES IN A MULTICAST VPN

FIELD OF THE INVENTION

The present invention relates generally to computer networking and Virtual Private Networks (VPNs). Specifically, the present invention relates to a system and method for monitoring customer control messages in a multicast VPN.

BACKGROUND OF THE INVENTION

In recent years, the nature of a computer network has expanded from a single wired network accessed by users located within an enterprise's premises to include networks of multiple premises of a single enterprise, networks located at one site that are accessed by users at many different sites, networks that are accessed by users working from home or while traveling, and networks that are accessed wirelessly, both from within and outside the enterprise's premises. In all of these cases, the users wish to access and use the applications and documents stored on the central network just as if they were physically present and using a secure wired connection to the network made within the enterprise's premises.

One way to address the need for such secure remote connections has been through the use of Virtual Private Networks. Such networks, known as VPNs, are widely used in the art to connect an enterprise's users to the enterprise's network, even if the users are in geographically disparate locations. Several prior art patents describe the architecture and operation of such Virtual Private Networks as are known in the art. Among these are U.S. Pat. No. 6,339,595 to Rekhter et al, which discloses a system and method for tagging data packets so that they are properly routed during the transit from the enterprise network to the remote user. Another such prior art patent is U.S. Pat. No. 6,788,681 to Hurren et al., which discloses a method and apparatus for provisioning a large number of VPNs over a connectionless network. U.S. Pat. No. 6,912,232 to Duffield et al., discloses an apparatus and method for using multiplexing to allocate VPN traffic to maximize efficiency in utilizing network resources.

VPNs such as those disclosed in these patents traditionally support only point-to-point, or unicast, communications between customer sites. Typically, an enterprise will use a service provider to design and operate the network of routers and circuits that make up a VPN. However, more recently, VPN customers are requesting that its service providers make available point-to-multipoint, or multicast, service in their VPNs. This demand has led to the creation of Multicast VPN (MVPN) technology, which supports wider distribution of communications in a VPN than is available in a point-to-point service. By "multicast" as used herein is intended the transmission to a plurality of users (or non-users) determining a group or groups of terminal apparatus, as differentiated from the term "broadcast" which implies a transmission to all terminals of a network.

A leader in the development of this MVPN technology is Cisco Systems, Inc., who has developed distribution systems and methods for such multicast communication, as is described in the Cisco Systems white paper, "Multicast Virtual Private Networks" and "Multicast VPN," also by Cisco Systems. MVPN technology permits the efficient distributed replication of data because only one copy of a data packet is needed to traverse from the source, and distribution trees are used to replicate the packet for distribution to all users on the VPN. The efficiency gain of an MVPN derives from its use of Multicast Distribution Trees (MDTs) in the provider's network to leverage that network's packet replication capabilities to deliver VPN traffic to only the relevant customer sites, using only the necessary links in the backbone. Such technology will enable efficient support for applications such as videoconferencing, webcasting, and software distribution in a VPN.

MVPN technology requires two layers of multicast communication. First, within the VPN, customer traffic in the form of data packets are sent from a single source to multiple users using IP multicast technology known in the art as described in, for example, Cisco Systems, "IP Multicast Technology Overview." Second, the customer multicast technology is transported between customer locations across the provider backbone. This is accomplished by encapsulating traffic sent to a customer multicast group address within an IP packet that is addressed to a provider multicast group address. All Provider Edge (PE) routers to which customers of the VPN are attached join in this multicast group and receive all traffic sent to it.

Thus, there is multicast traffic to and from both a customer multicast group and a provider multicast group. An enterprise using MVPN service often will want to obtain information regarding this traffic, to ensure that only authorized users are accessing the network via the MVPN or to ensure that MVPN resources are being used efficiently. For example, as disclosed in U.S. Pat. No. 6,910,067 to Silverman et al., an enterprise may wish to monitor the number of users in a VPN session to ensure that the number of users does not exceed a maximum number of sessions supported by the network. Another use for monitoring is disclosed in U.S. Pat. No. 6,965,883 to Xu et al., wherein use of a multicast infrastructure is monitored to permit billing for multicast services provided.

However, neither of these methods addresses the need for a service provider that supports MVPN service to collect information regarding multicast transactions from both the customer multicast group and the provider multicast group or to collect information regarding the relationship between these two groups. Such information will be necessary to permit the service provider to manage, monitor, and debug the multicast VPN service in order to provide the optimum service to its customers.

One way to monitor an MVPN is to place a monitoring station within each VPN to provide information regarding each individual VPN network. However, such a method is expensive, since it would require placement of a large number of monitoring stations. Such a method also is impractical, since it would require the placement of a monitoring station within customer networks to which the service provider might not have access.

Thus, there is a need for a system and method to collect multicast-related control information in the provider background and use this control information to provide a service provider with information regarding the status of the MVPN.

BRIEF SUMMARY OF THE INVENTION

The present invention provides a system and method to passively monitor multicast traffic in the provider backbone. A monitoring station is located within the service provider network. Upon creation of an MVPN, this monitoring station joins the default multicast distribution tree ("MDT") in the provider backbone used to carry traffic within that MVPN session, and receives the customer's multicast control traffic and low bandwidth data traffic that are encapsulated in packets addressed to the default MDT. The MDT uses the provider backbone's underlying multicast service to deliver packets from a given origin to multiple destinations.

The monitor of the present invention emulates a PE router on the MVPN without actually participating in the MVPN session. By emulating a PE router on the MVPN as it passively monitors the MVPN traffic, the monitor receives all the packets distributed from the MDT during the MVPN session. The monitor decapsulates the packets it receives, disregards any customer data packets, and analyzes the remaining packets. These packets include multicast routing protocol control messages exchanged by the PE routers relevant to the customer's multicast traffic and messages that identify the mapping of customer multicast groups to non-default MDT groups.

Using the information contained in these two kinds of packets, the monitor learns the identity of the PE routers participating in the MVPN; the identity of the customer multicast groups that are carried on each provider multicast data tree (MDT), and the identity of the MDT that it is carried on. This information is collected for each customer multicast group, both upstream and downstream at each PE router.

In this manner, the Provider Edge (PE) routers active in the MVPN can be identified and compared to the PE routers which are authorized to participate and thus enable the service provider to ensure both that all PE routers that participate in a particular customer's VPN are authorized and that all PE routers that should participate are in fact participating. The customer groups that participate in the MVPN and their associated Customer Edge (CE) routers can also be identified, using the routers' downstream and upstream state information to identify the customer sites associated with a particular customer group. In addition, the customer groups participating in the MVPN can be mapped to the provider groups and the associated PE routers that they use in the backbone to provide information regarding the correlation between the PE routers and customer groups on the MVPN.

DETAILED DESCRIPTION OF THE INVENTION

In the following description of the various embodiments, reference is made to the accompanying drawings, which form a part of the description of the invention, and in which various embodiments of the invention are shown by way of illustration. It is to be understood that these embodiments are not exclusive, and that other embodiments may be utilized and structural and functional modifications may be made without departing from the scope and spirit of the present invention.

Figure 1:
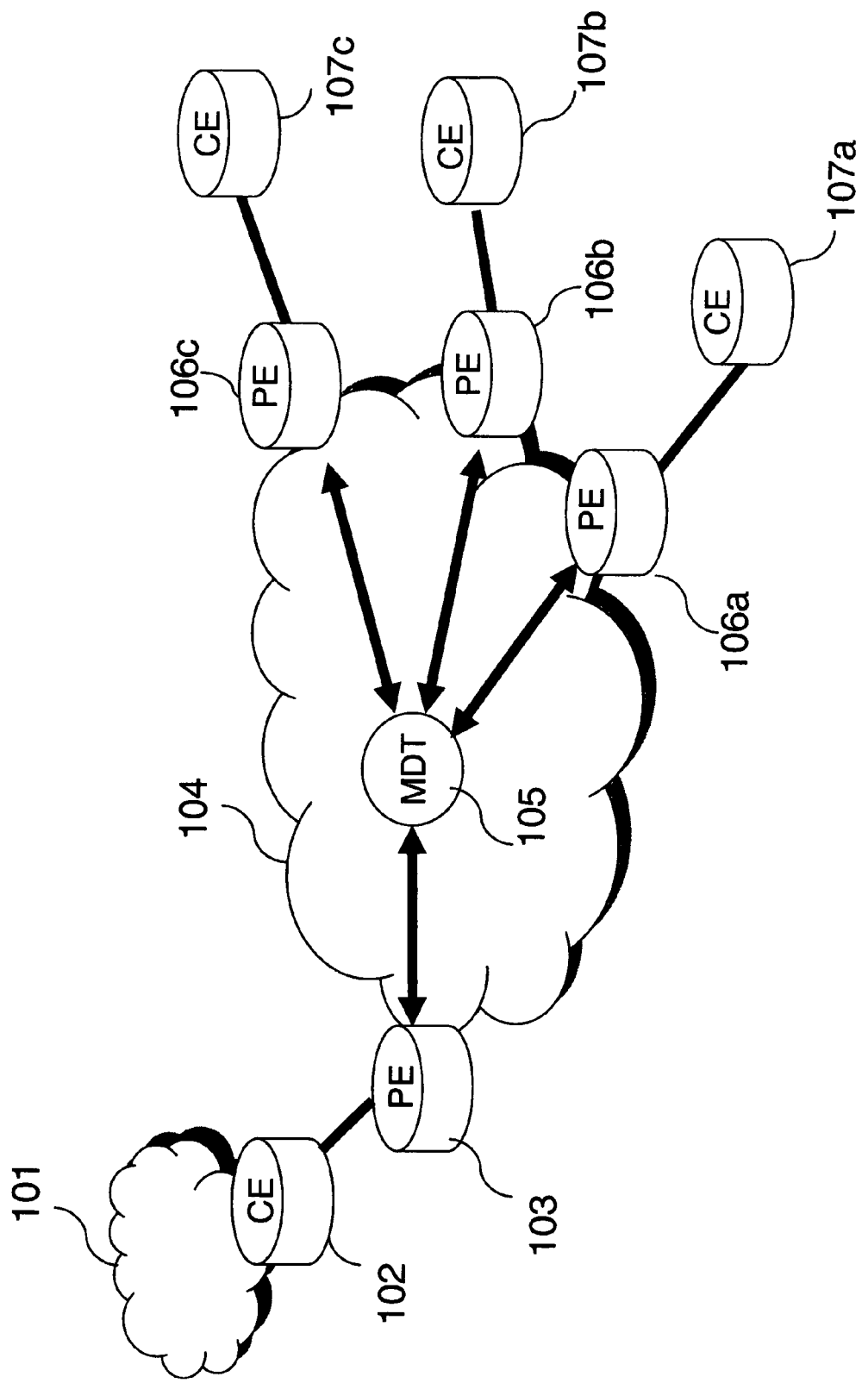
FIG. 1 is a block diagram illustrating the architecture of a typical multicast VPN session.

In a multicast VPN (hereinafter referred to as an "MVPN"), a single transmission of data is sent to multiple recipients by IP multicast technology well known in the art. A typical MVPN configuration is shown in FIG. 1. As shown in FIG. 1, during an MVPN session, the main office network 101 is connected to a Customer Edge (CE) router 102 through which it is connected to PE router 103. PE router 103 in turn is connected to the other PE routers 106a, 106b, and 106c by way of Multicast Data Tree (MDT) 105 in service provider network 104. This MDT is a multicast distribution tree used in IP multicast technology or other transfer protocols known in the art, such as MultiProtocol Label Switching (MPLS), and can take the form of a source tree, a shared tree, or any other multicast distribution tree known in the art. For example, it is possible to use MPLS point-to-multipoint (P2MP) encapsulation to provide the MDT in the provider backbone. It is to be appreciated that the present invention could also be part of P2MP MPLS trees and thus used to monitor an MVPN using MPLS encapsulation.

The source PE router 103 encapsulates the customer's multicast traffic, as received natively from the attached CE router 102, and sends it on the MDT. The routers on the MDT replicate the data packets received from the source PE router 103, and forward the packets to destination PE routers 106a, 106b, and 106c, using IP Multicast or other transfer protocols known in the art such as MPLS. Each of these PE routers 106a, 106b, and 106c in turn is associated with a CE router 107a, 107b, and 107c, respectively, for each recipient of the multicast data. Each PE router 106a, 106b, and 106c decapsulates the data packet and forwards the data traffic natively to their respective attached CE routers 107a, 107b, and 107c. Each CE router 107a, 107b, and 107c is ignorant of the presence of the VPN 104 and its encapsulation in the backbone.

Thus, in an MPVN, there may be many PE and CE routers connected during a single MVPN session. As is known in the art, one or more CE routers connect to a given PE router, and one or more PE routers may participate in the MVPN session in the backbone. It is also possible to have an MVPN consisting of only a single PE router with several CE routers attached to it.

Because of the multiplicity of PE routers and CE routers that may participate in an MVPN session, it is desirable that the service provider for the MVPN session have a way to monitor the MVPN to ensure that all aspects of the MVPN are functioning properly, that all participants in the MVPN session are authorized and that all authorized participants are able to participate in the session. Thus, there is a need in the art for a monitoring system to permit a service provider to passively monitor the MVPN traffic. However, it is also desirable that such a monitor receives only control information regarding the MVPN and does not receive that actual data transmitted via the MVPN, since such data is often confidential or proprietary to the MVPN participants.

Figure 2:
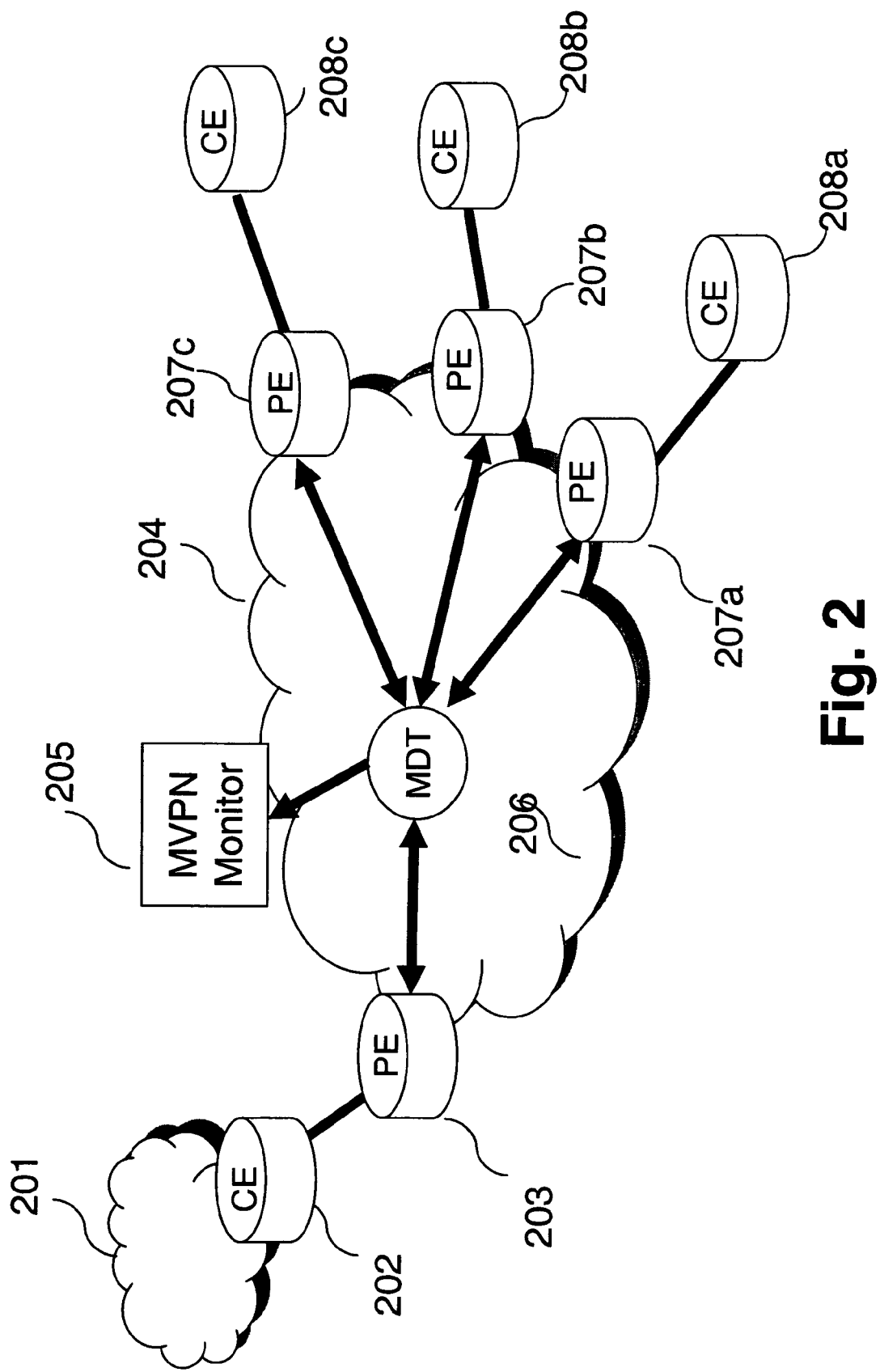
FIG. 2 is a block diagram illustrating the architecture of a multicast VPN with the monitor of the present invention.

The present invention provides a monitor that permits the service provider to learn the status of the MVPN at any time while it is active and that also permits the service provider to collect and maintain data regarding the performance of the MVPN. As shown in FIG. 2, an MVPN session is established and conducted as described above with respect to FIG. 1, with data packets transmitted from main office network 201 through CE router 202 to PE router 203 and the other PE routers 207a, 207b, and 207c by way of Multicast Data Tree (MDT) 206 in service provider network 104 for eventual transmittal to CE routers 208a, 208b, and 208c. All of the PE routers to which the MVPN customer attaches during the MVPN session are also connected to this MDT. The present invention adds the additional element of the MVPN monitor 205 that is also attached to the MDT.

The monitoring station consists of software running on, for example, commodity UNIX-based hardware (e.g., Sun, PC). It may be located at a Network Operations Center, in a Data Center, or any other location inside the provider's network with sufficient connectivity. Using this software and hardware, the monitoring station emulates a PE router on the MVPN and receives and processes packets transferred among the participants in the MVPN to obtain status and control information regarding the PE and CE routers on the MVPN.

Using the structure of FIG. 2 as exemplary, in accordance with the present invention, each MVPN customer is assigned a unique default MDT 206. The customer's multicast control traffic, such as routing information for the data packets, information regarding which PE routers are participating in the MVPN, and which customer groups are mapped to each backbone group, together with some of the actual data packets intended for the participants in the MVPN, are encapsulated in packets addressed to the default MDT in the service provider backbone network. The MVPN monitor 205 of the present invention receives all of these packets, and because it is attached to the MDT, the MVPN monitor 205 of the present invention also receives all of the packets sent by any of the PE routers 207a, 207b, 207c to other members of the MPVN group. Unlike the other PE routers in the MVPN, the MVPN monitor does not send any data, but merely passively receives it from all other participants in the MVPN group.

Figure 3:
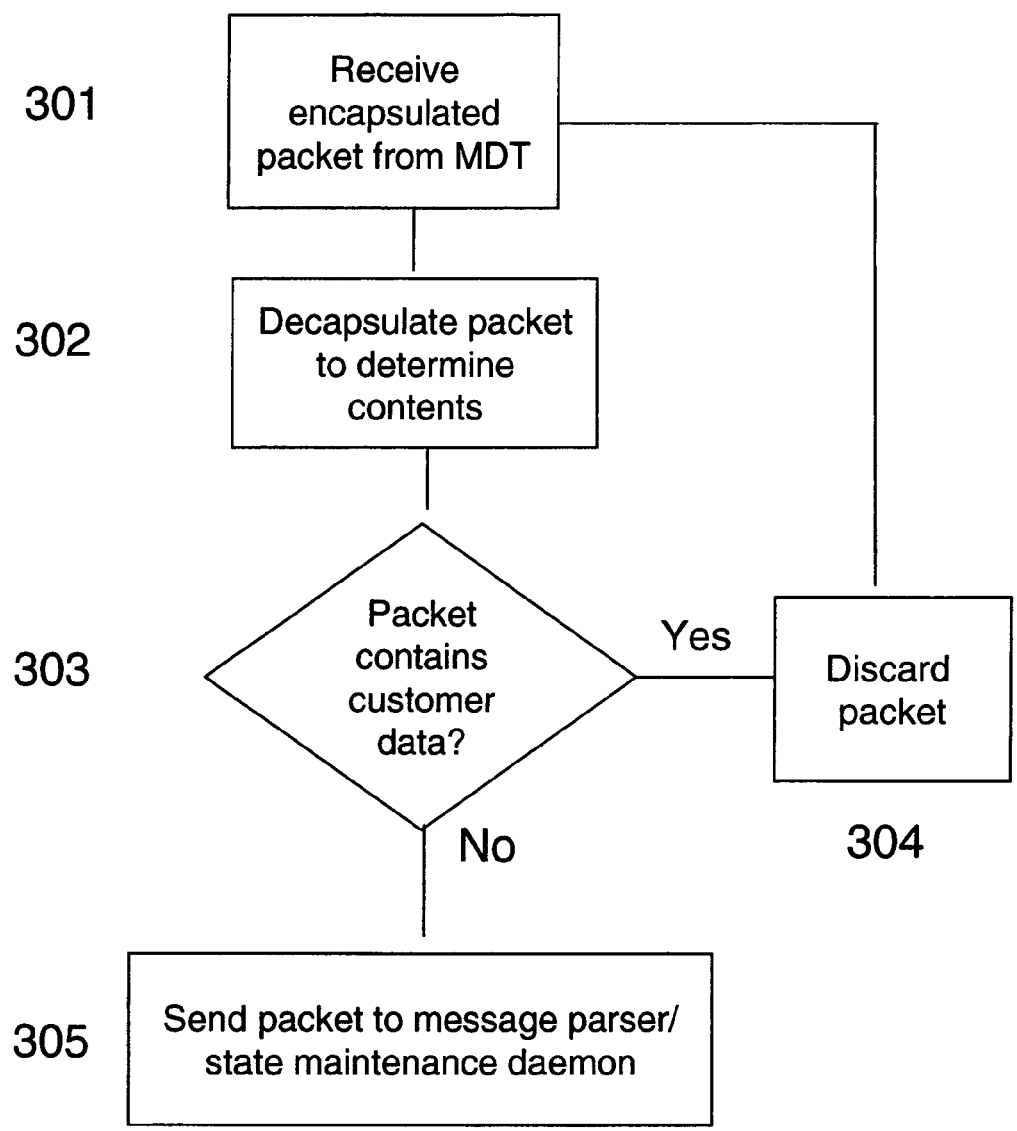
FIG. 3 is a flow chart illustrating the logic flow of the monitor of the present invention.

FIG. 3 is a flow chart showing the initial processing that the MVPN performs on the processing received from the MDT. In step 301, the MVPN monitor receives a packet from the MDT. In step 302, the MVPN monitor decapsulates the packet and in step 303 examines its contents to determine whether it contains customer data or contains control information. If it contains customer data, the MVPN monitor discards the packet as in step 304 and returns to process the next packet. If the packet does not contain customer data, the MVPN monitor sends the packet to the message parser/state maintenance daemon for further processing.

Much of this further processing involves a determination of the state of each PE router participating in the MVPN. In accordance with procedures known in the art, each PE router participating in the MVPN is assigned a unique identifier (generally an IP address, assigned by the service provider) so that packets generated during the course of the MVPN session can be directed to the proper recipient. As is known in the art, this unique IP address permits the PE routers to participate in the backbone network, is used to address the routers for configuration management, network status monitoring, or other control protocols such as BGP, OSPF or other routing protocols as known in the art, and to forward multicast traffic appropriately.

In accordance with procedures known in the art, the multicast routing protocol used by the service provider in the MVPN sends messages to the MDT refreshing its state. The multicast routing protocol may be Protocol Independent Multicast (PIM) or any other multicast routing protocol whose state can be determined by passively receiving control messages such as PIM-SSM (PIM-Source-Specific-Multicast) or PIM-BIDIR (Bidirectional PIM).

If the state of the MVPN is unchanged, the refresh message (for example, a "Join/Prune" message as used in PIM) is sent periodically, for example, every 60 seconds. If, however, the state of the MVPN is changed, the routing protocol immediately sends a message to the MDT containing information regarding the change. Changes in state that prompt such immediate messages to the MDT include the addition or removal of a PE router from the session, changes in customer group/backbone group mappings, and the addition or removal of a customer site from a given customer group.

Figure 4:
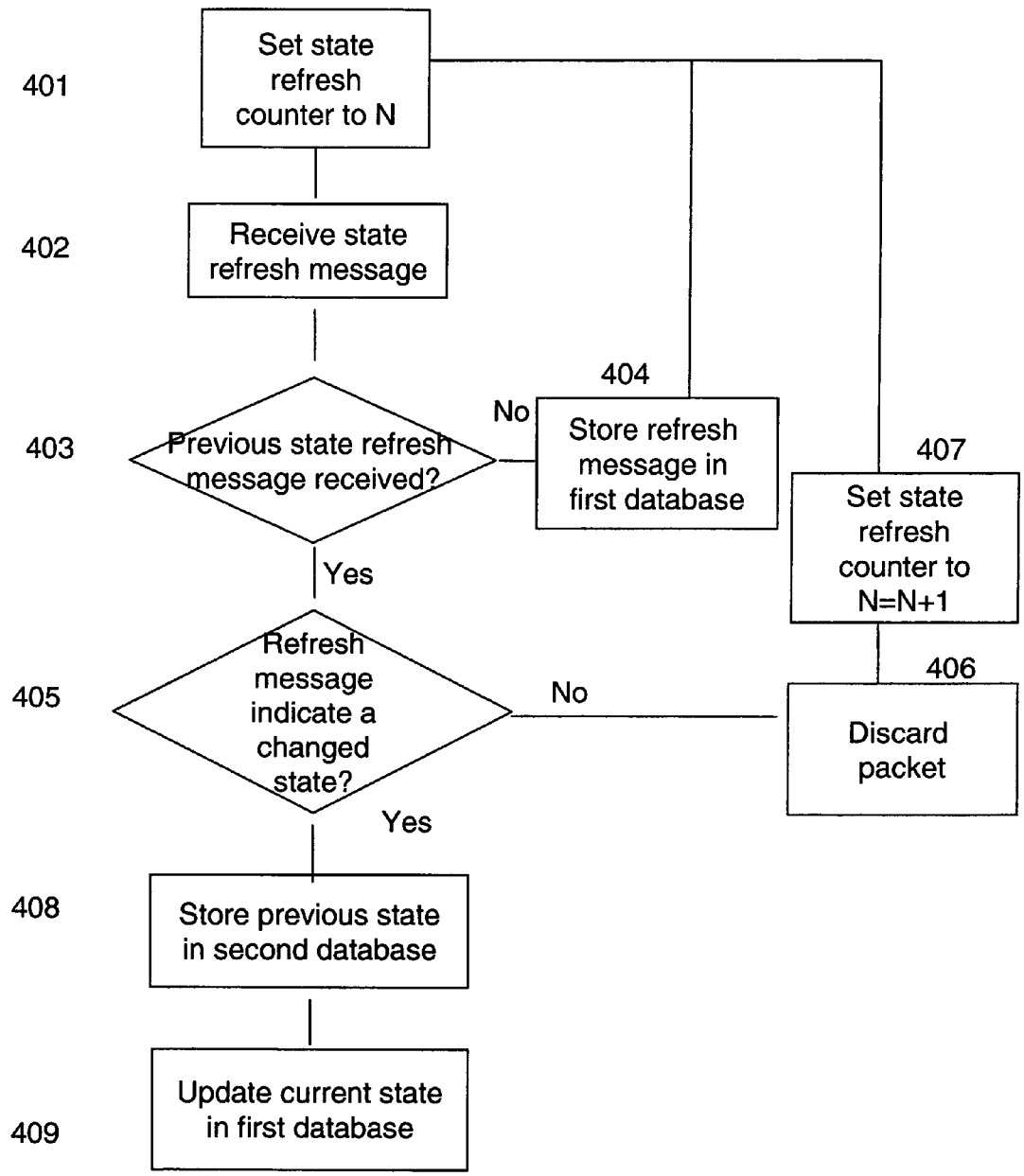
FIG. 4 is a flow chart further illustrating the logic flow of the monitor of the present invention.

FIG. 4 shows the logic flow for the further processing performed on the data received by the MVPN monitor. As shown in FIG. 4, in step 401, the message parser/state maintenance daemon sets a state refresh counter to N so that the number of state refresh messages received can be monitored. At step 402, the state maintenance daemon receives the packet sent by the MVPN monitor. This packet is in the form of a refresh message sent by the multicast routing protocol as set forth above. In step 403, the daemon examines the refresh message contained in the packet to determine whether a previous refresh message has been received. If the refresh message is the first one received for a particular MVPN session, the state indicated in the message is stored in a first database in step 404 and the daemon awaits the next refresh message. The database used for storage of the MVPN state information can be a MySQL database or any other relational database known in the art, such as postgresql or Oracle.

If the daemon determines in step 403 that a previous refresh message has been received for the MVPN session, in step 405, the daemon compares the status shown in the refresh message to the status stored in the first database to determine whether the refresh message indicates a changed state. If in step 405, the refresh message does not indicate a changed state, in step 406 the daemon discards the packet containing the refresh message, increments a counter in step 407 to note that a refresh message has been received and that the refreshed state is the same as the previous state, and awaits the next message. If, however, in step 405 the refresh message does indicate a changed state, such as the number and identity of PE routers attached to the MVPN session, a new customer site joining a given customer group, the last customer site leaving a given group, or a given customer group using enough bandwidth that it must switch to a separate MDT, the daemon saves the previously stored state to a second database in step 408 and in step 409 updates the first database to reflect the current state.

The state in the database is saved as a series of individual records. For example, in one embodiment of the present invention wherein the PIM multicast routing protocol is used, the state is referred to as "(*,G)" (star-G) state, which is for an entire group G, or "(S,G)" state, which is for a given source S in the group G. Each record consisting of a portion of the state is stored separately in the database. In this embodiment, if Provider Edge router number 1 has joined customer group 1 in Multicast VPN A, the record would indicate that PE1 has joined *,G1 in MVPN A. Similarly, if Provider Edge router number 2 has joined customer group 1 in the same multicast VPN, the record would indicate that PE2 has joined *,G1 in MVPN A; if Provider Edge router number 2 joined customer group 2 in Multicast VPN A, the record would indicate that PE2 joined *,G2 in MVPN A, and if it joined customer group 1 in Multicast VPN B, a different record would indicate this. Thus, the state that is being saved during each refresh cycle is the PIM Join/Prune state per-PE per-MVPN. It is to be noted that any one variable in this record scheme may change, with the others remaining the same (PE, source/*, group, or MVPN identity).

In this way, the MVPN monitor of the present invention not only provides information regarding the current state of the MVPN session, but provides information regarding all states of the session for its entire lifetime. In addition, because the second database includes all information regarding the MVPN session during its lifetime, it is possible to obtain "snapshot" information regarding the status of the MVPN session, such as information regarding its status at a particular time or changes to the session during a particular time frame.

Figure 5:
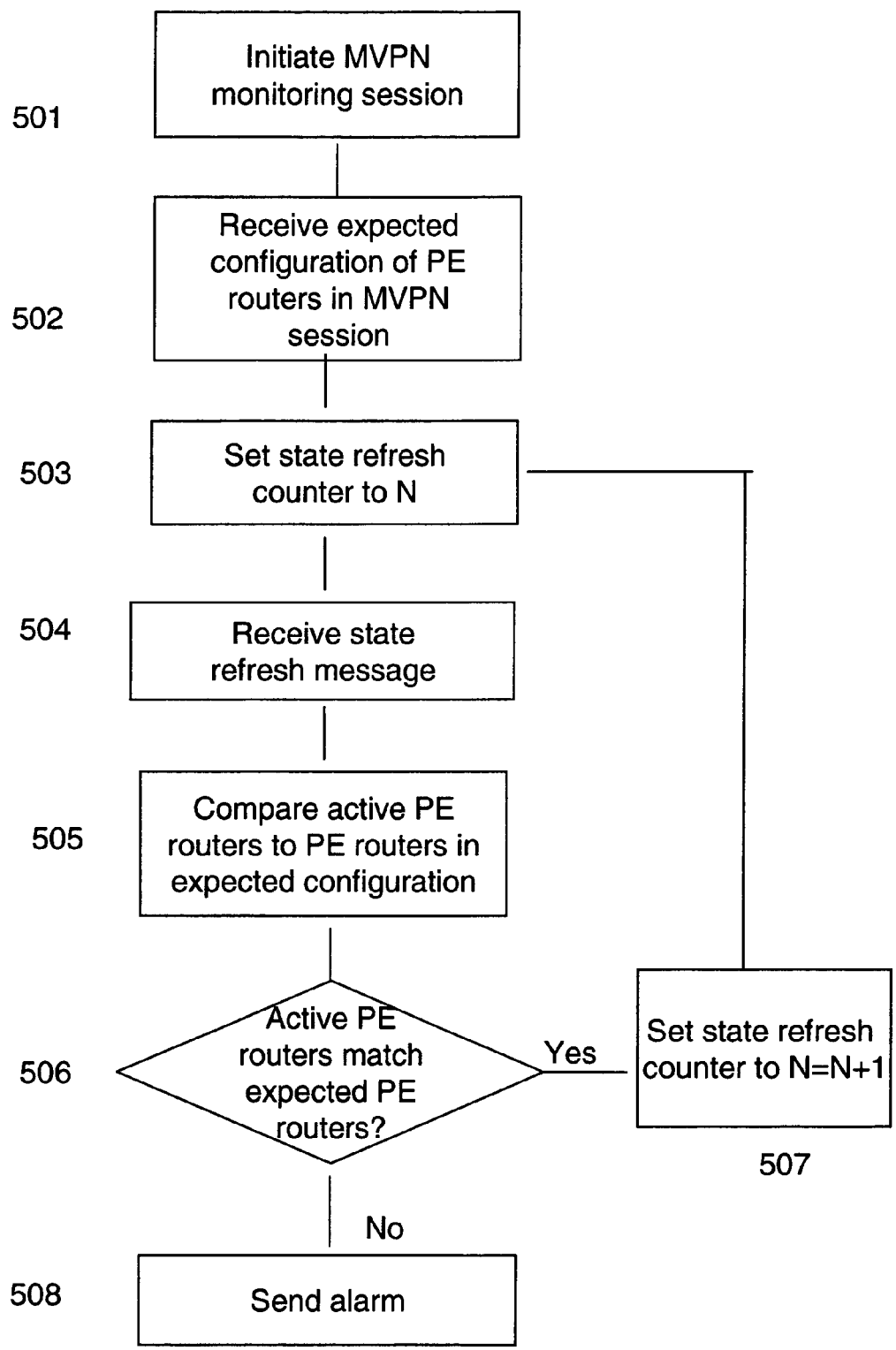
FIG. 5 is a flow chart illustrating an additional aspect of the logic flow of the monitor of the present invention.

In another aspect of the present invention, the MVPN monitor also provides alerts to the service provider if the session information is not as expected. As shown in FIG. 5, at the initiation of an MVPN session in step 501, the MPVN monitor receives data regarding the expected configuration of the MPVN session, such as the identity of the PE routers participating in the MVPN session, in step 502 and stores this expected configuration in memory within the MPVN monitor. This data regarding the expected configuration can be provided in many ways, such as by a manual entry by the initiator of the MVPN session of the PE routers that will participate in the MVPN, by an automatic configuration provided by the service provider based on parameters provided by the MVPN customer, by a typical MVPN configuration provided by the service provider based on the type of MVPN customer, or by any other way that provides an expected configuration of the MVPN session that can be compared to the actual session data.

In step 503, the message parser/state maintenance daemon sets a state refresh counter to N so that the number of state refresh messages received can be monitored. In step 504, the MVPN monitor receives a state refresh message from the MDT in a manner previously described. In addition to the step 405 of checking to see whether the state refresh message indicates a changed state in the MVPN, at step 505, the MVPN monitor periodically compares the state information regarding the current PE routers that are actually participating in the MVPN session to the expected configuration stored in memory. If in step 506 the PE routers actually participating in the MVPN session match those in the expected configuration, the MVPN monitor increments a counter in step 507 and awaits the time for the next status check. However, if in step 506, the PE routers actually participating in the MVPN session do not match those in the expected configuration, in step 508, the MVPN monitor sends an alarm to the service provider so that appropriate action can be taken. For example, some of the expected PE routers may not actually be participating, and the service provider must take steps to ensure that the "missing" PE routers become connected to the MVPN. Perhaps even more importantly, if the check of active PE routers turns up one or more routers that is not among those expected, the "extra" router may be a hacker or some other unauthorized participant in the MVPN session, and thus, the present invention will permit the service provider to quickly identify such an unauthorized user and take steps to terminate the unauthorized session.

The present invention may also include a user interface to permit the user of the MVPN monitor, who may be either the service provider or other recipient of the monitoring information such as the MVPN customer, to view and interact with the information collected by the MVPN monitor. In one embodiment of the present invention, this user interface is web-based and accessible over the Internet so that multiple parties to the MVPN session, such as the service provider and the MVPN customer, may easily share the collected information. However, it is to be noted that the user interface may take any other database-access form such as a command line in a database software package or even a separate application.

Any of the kinds of information collected by the present invention can be accessed by the user interface, either as a display on a screen or as a printout by any conventional manner available in the particular database used to store the information. In addition, the present invention contemplates that reports regarding the information collected by the MVPN monitor of the present invention can be generated and produced by the database in any manner available to the user of the database.

Information which may be collected by the MVPN monitor of the present invention and accessed by the user of MVPN monitor include, but are not limited to: the identity of the VPNs being monitored; the identity of the PE routers that are active in a given MVPN session; the identity of the customer groups that are active in the MVPN session; the customer group—PE router mapping; and the customer group—backbone group mapping. This information enables the service provider to ensure that all aspects of the MVPN are functioning properly and that no unauthorized access to the MVPN session has been made. This information also enables the MVPN customer to be confident in the security of its MVPN sessions and to ensure that its MVPN sessions are reaching all of the desired parties.

The inventive methods disclosed herein may be embodied as computer-readable instructions stored on a computer-readable medium such as a CD-ROM, DVD ROM, removable storage device, hard disk, system memory, embedded memory, flash memory or other data storage medium that stores computer-executable components or software modules. Each component or module may be an executable program, a data link library, a configuration file, a database, a graphical image, a binary data file, a text data file, an object file, a source code file, or the like. More or fewer software modules may alternatively be used and still be within the scope of the present invention. When one or more computer processors execute one or more of the software modules, the software modules interact to cause one or more computer systems to perform according to the teachings of the present invention.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended embodiments.

We claim:

1. A method for passively monitoring a status of a multicast virtual private network (MVPN) session comprising:
   connecting to a multicast data tree associated with the MVPN session;
   receiving a first data packet comprising first status information regarding the MVPN session;
   storing the first status information regarding the MVPN session to a first database;
   receiving a second data packet comprising second status information regarding the MVPN session;
   comparing the second status information to the first status information to determine whether the second status information differs from the first status information;
   if the second status information differs from the first status information, then:
      storing the first status information to a second database, and
      storing the second status information to the first database; and
   if the second status information does not differ from the first status information, then:
      discarding the second data packet, and
      incrementing a counter in the first database.

2. The method of claim 1, wherein the first status information comprises an actual configuration of the MVPN session during a first time interval and wherein the second status information comprises an actual configuration of the MVPN session during a second time interval.

3. The method of claim 1, further comprising:
   activating a user interface; and viewing at least one entry of at least one of the first database and the second database.

4. The method of claim 1, further comprising:
prior to comparing the first status information and the second status information, determining whether the first data packet or the second data packet contains customer data;
if the first data packet contains customer data, then discarding the first data packet; and
if the second data packet contains customer data, then discarding the second data packet.

5. The method of claim 2, further comprising:
receiving an expected configuration of the MVPN session;
if the first status information is stored to the first database, then:
    comparing the actual configuration of the MVPN session during the first time interval to the expected configuration, and
    if the actual configuration of the MVPN session during the first time interval does not match the expected configuration, then providing an alarm; and
if the second status information is stored in the first database, then:
    comparing the actual configuration of the MVPN session during the second time interval to the expected configuration, and
    if the actual configuration of the MVPN session during the second time interval does not match the expected configuration, then providing an alarm.

6. The method of claim 2, wherein the actual configuration of the MVPN session during the first time interval comprises an identity of at least one participant in the MVPN session during the first time interval and wherein the actual configuration of the MVPN session during the second time interval comprises an identity of at least one participant in the MVPN session during the second time interval.

7. A method for passively monitoring a status of a multicast virtual private network (MVPN) session comprising:
    connecting to a multicast data tree associated with the MVPN session;
    receiving information regarding an identity of a first participant in the MVPN session and an identity of a second participant in the MVPN session, the second participant being associated with the first participant;
    receiving a first data packet comprising first status information regarding the first participant and the second participant in the MVPN session;
    storing the first status information regarding to a first database;
    receiving a second data packet comprising second status information regarding the first participant and the second participant in the MVPN session; comparing the second status information to the first status information to determine whether the second status information differs from the first status information;
    if the second status information differs from the first status information, then:
        storing the first status information to a second database, and
        storing the second status information to the first database; and
    if the second status information does not differ from the first status information, then:
        discarding the second data packet, and
        incrementing a counter in the first database.

8. The method of claim 7, further comprising:
receiving an expected configuration of the MVPN session;
if the first status information is stored to the first database, then:
    comparing the first status information to the expected configuration, and
    if the first status information does not match the expected configuration, then providing an alarm; and
if the second status information is stored in the first database, then:
    comparing the second status information to the expected configuration, and
    if the second status information does not match the expected configuration, then providing an alarm.

9. The method of claim 7, further comprising:
activating a user interface; and
viewing at least one entry of at least one of the first database and the second database.

10. A system for passively monitoring status of a multicast virtual private network (MVPN) session comprising:
    a processor connected to a multicast data tree associated with the MVPN session,
    a first data packet comprising first status information regarding the MVPN session;
    a first database for storage of the first status information;
    a second data packet comprising second status information regarding the MVPN session; and
    the processor for:
        comparing the second status information to the first status information to determine whether the second status information is different from the first status information,
        if the second status information is different from the first status information, then:
            storing the first status information to a second database, and
            storing the second status information to the first database, and
        if the second status information is not different from the first status information, then:
            discarding the second data packet, and
            incrementing a counter in the first database.

11. The system of claim 10, wherein the first status information comprises an actual configuration of the MVPN session during a first time interval and wherein the second status information comprises an actual configuration of the MVPN session during a second time interval.

12. The system of claim 10, wherein the processor is further for:
receiving an expected configuration of the MVPN session;
if the first status information is stored to the first database, then:
    comparing the actual configuration of the MVPN session during the first time interval to the expected configuration, and
    if the actual configuration of the MVPN session during the first time interval does not match the expected configuration, then providing an alarm; and
if the second status information is stored in the first database, then:
    comparing the actual configuration of the MVPN session during the second time interval to the expected configuration, and
    if the actual configuration of the MVPN session during the second time interval does not match the expected configuration, then providing an alarm.

13. A system for passively monitoring a status of a multicast virtual private network (MVPN) session comprising:

a processor connected to a multicast data tree associated with the MVPN session, information regarding an identity of a first participant in the MVPN session and an identity of a second participant in the MVPN session, the second participant being associated with the first participant;

a first data packet comprising first status information regarding the first participant and the second participant in the MVPN session;

a second data packet comprising second status information regarding the first participant and the second participant in the MVPN session;

a first database for storage of the first status information; and the processor for:
  comparing the second status information to the first status information to determine whether the second status information is different from the first status information
  if the second status information is different from the first status information, then:
    storing the first status information to a second database, and
    storing the second status information to the first database, and
  if the second status information is not different from the first status information, then:
    discarding the second data packet, and
    incrementing a counter in the first database.

14. The system of claim 13, wherein the processor is further for:
  receiving an expected configuration of the MVPN session;
  if the first status information is stored to the first database, then:
    comparing the first status information to the expected configuration, and
    if the first status information does not match the expected configuration, then providing an alarm; and
  if the second status information is stored in the first database, then:
    comparing the second status information to the expected configuration, and
    if the second status information does not match the expected configuration, then providing an alarm.

15. A computer readable medium having a program in computer readable code which, when executed by a computer, cause the computer to:
  connect to a multicast data tree associated with a multicast virtual private network (MVPN) session;
  receive a first data packet comprising first status information regarding the MVPN session;
  store the first status information regarding the MVPN session to a first database;
  receive a second data packet comprising second status information regarding the MVPN session;
  compare the second status information to the first status information to determine whether the second status information differs from the first status information;
  if the second status information differs from the first status information, then:
    store the first status information to a second database, and
    store the second status information to the first database; and
  if the second status information does not differ from the first status information, then:
    discard the second data packet, and
    increment a counter in the first database.

16. A computer readable medium having a program in computer readable code which, when executed by a computer, cause the computer to:
  connect to a multicast data tree associated with a multicast virtual private network (MVPN) session;
  receive information regarding an identity of a first participant in the MVPN session and an identity of a second participant in the MVPN session, the second participant being associated with the first participant;
  receive a first data packet comprising first status information regarding the first participant and the second participant in the MVPN session;
  store the first status information regarding the MVPN session to a first database;
  receive a second data packet comprising second status information regarding the first participant and the second participant in the MVPN session;
  compare the second status information to the first status information to determine whether the second status information differs from the first status information;
  if the second status information differs from the first status information, then:
    store the first status information to a second database, and
    store the second status information to the first database; and
  if the second status information does not differ from the first status information, then:
    discard the second data packet, and
    increment a counter in the first database.

* * * * *